(12) United States Patent
Kreuter

(10) Patent No.: US 8,789,807 B2
(45) Date of Patent: Jul. 29, 2014

(54) QUICK DISCONNECT ACTUATOR MOUNTING

(75) Inventor: Christopher Louis Kreuter, Goshen, IN (US)

(73) Assignee: KMC Controls, Inc., New Paris, IN (US)

( * ) Notice: Subject to any disclaimer, the term of this patent is extended or adjusted under 35 U.S.C. 154(b) by 246 days.

(21) Appl. No.: 13/368,068

(22) Filed: Feb. 7, 2012

(65) Prior Publication Data
US 2012/0199776 A1 Aug. 9, 2012

Related U.S. Application Data

(60) Provisional application No. 61/440,954, filed on Feb. 9, 2011.

(51) Int. Cl.
*F16K 31/00* (2006.01)

(52) U.S. Cl.
USPC .......................................... 251/291; 251/293

(58) Field of Classification Search
USPC .......................................... 251/291, 292, 293
See application file for complete search history.

(56) References Cited

U.S. PATENT DOCUMENTS

| | | | | |
|---|---|---|---|---|
| 3,874,859 A * | 4/1975 | Krause | .......................... | 96/408 |
| 4,135,838 A * | 1/1979 | Vandenberg | .................. | 403/316 |
| 4,429,704 A | 2/1984 | Jones | | |
| 4,647,003 A * | 3/1987 | Hilpert et al. | .................... | 251/14 |
| 4,719,939 A * | 1/1988 | Killian | ..................... | 137/315.35 |
| 4,887,634 A * | 12/1989 | Killian | ..................... | 137/315.35 |
| 4,953,586 A * | 9/1990 | Weyer | ....................... | 137/315.35 |
| 5,236,006 A | 8/1993 | Platusich et al. | | |
| 5,240,030 A * | 8/1993 | Wang | ............................ | 137/269 |
| 5,564,461 A * | 10/1996 | Raymond et al. | ........ | 137/315.35 |
| 5,634,486 A * | 6/1997 | Hatting et al. | ........... | 137/315.01 |
| 5,927,682 A | 7/1999 | Gul et al. | | |
| 5,954,088 A * | 9/1999 | Huang | ..................... | 137/315.21 |
| 6,135,417 A | 10/2000 | Wadsworth et al. | | |
| 6,286,853 B1 * | 9/2001 | Lauzon | ......................... | 280/487 |
| 6,748,967 B1 | 6/2004 | Smiltneek | | |
| 6,789,781 B2 * | 9/2004 | Johnson et al. | .............. | 251/291 |
| 6,848,672 B2 * | 2/2005 | Cross et al. | ................... | 251/292 |
| 7,641,172 B2 | 1/2010 | Richards et al. | | |
| 7,658,365 B2 | 2/2010 | Eschborn et al. | | |
| 7,874,542 B2 | 1/2011 | Olberding et al. | | |
| 7,900,889 B2 | 3/2011 | Tanghetti | | |
| 8,132,784 B2 * | 3/2012 | Ferrero | ......................... | 251/214 |
| 8,434,421 B2 * | 5/2013 | Fagan | ........................... | 116/309 |
| 2003/0127619 A1 * | 7/2003 | Wang | ............................. | 251/214 |
| 2006/0197044 A1 * | 9/2006 | Fortino | ..................... | 251/129.11 |
| 2012/0211688 A1 * | 8/2012 | Carlson et al. | ................ | 251/291 |

* cited by examiner

*Primary Examiner* — John K Fristoe, Jr.
*Assistant Examiner* — R. K. Arundale
(74) *Attorney, Agent, or Firm* — Shewchuk IP Services, LLC; Jeffrey D. Shewchuk

(57) ABSTRACT

A mounting apparatus and method couple an actuator to a valve or damper. The mounting apparatus includes five primary parts: a base which attaches to the valve or damper, an actuator mount which attaches to the actuator, a rotational coupler, a handle and a bail. The base and the actuator mount encircle the rotational axis in a mating relationship. The bail slides into aligned holes on the base and the actuator mount to secure the two together, preferably with legs on opposite sides of the rotational axis.

18 Claims, 9 Drawing Sheets

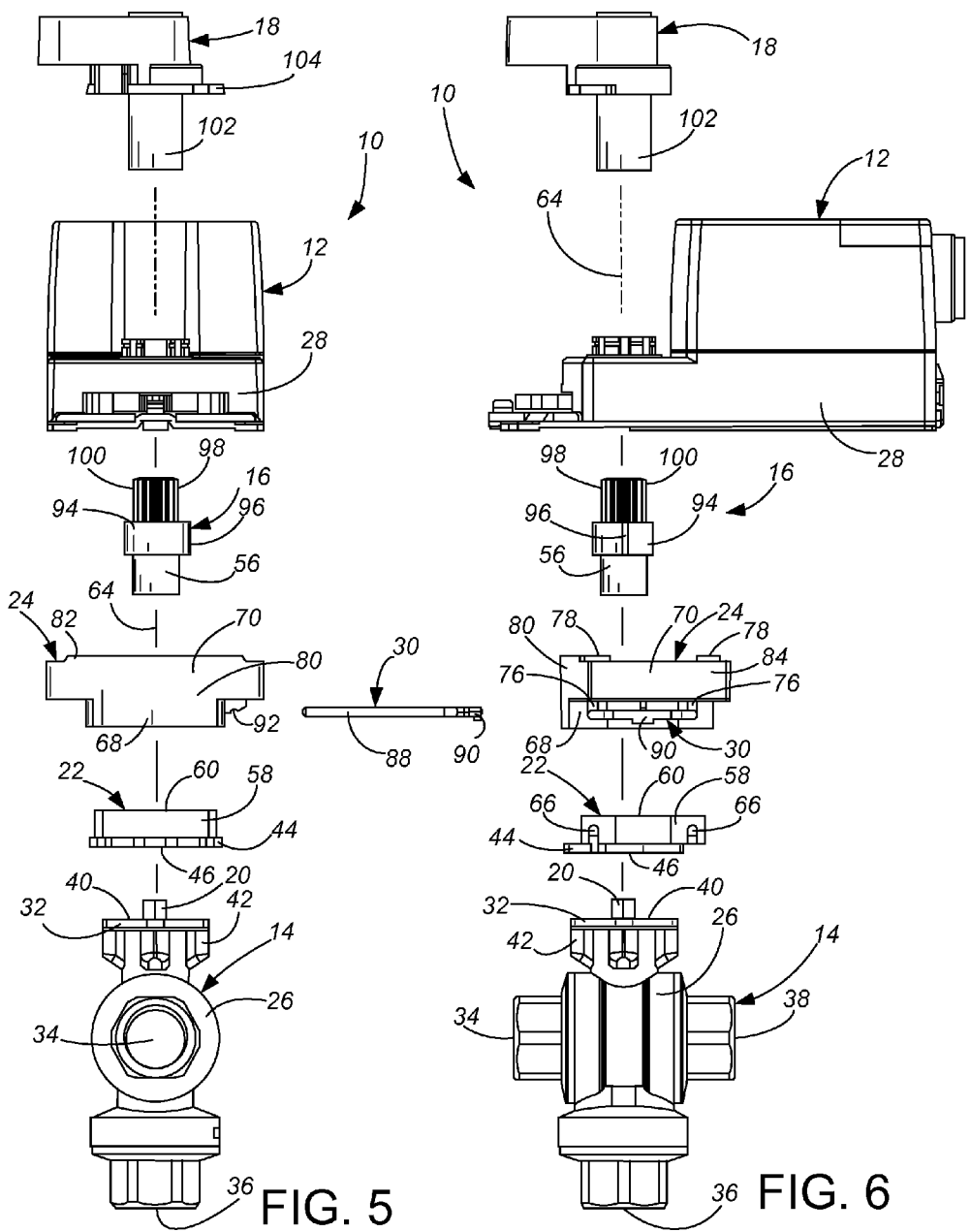

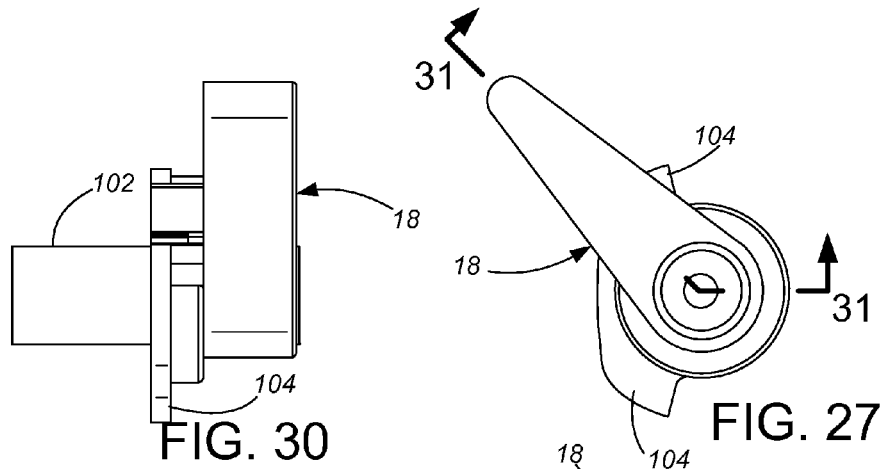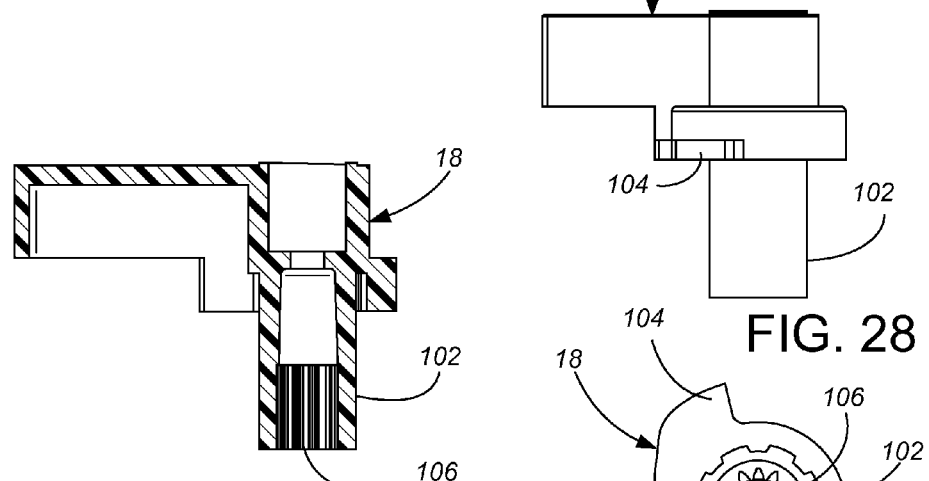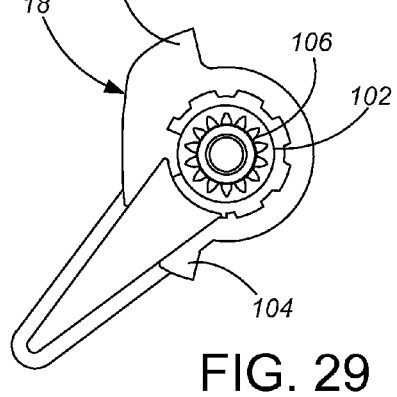

QUICK DISCONNECT ACTUATOR MOUNTING

CROSS-REFERENCE TO RELATED APPLICATION(S)

This application claims priority from Provisional Application No. 61/440,954, filed Feb. 9, 2011, entitled QUICK DISCONNECT ACTUATOR MOUNTING.

BACKGROUND OF THE INVENTION

The present invention is directed to actuators for valves and dampers, such as for attaching a valve actuator to the home main water valve. More particularly, the present invention is directed to methods and structures for attaching an actuator which supports the weight and moments of the actuator.

Actuators have long been used in HVAC systems to control valves and dampers. The actuator typically includes an electric motor geared to provide the torque to turn the valve stem or damper handle. An HVAC control system often provides an electrical signal to determine when and how far the actuator should open or close the attached valve or damper. More recently, the actuator may include a wireless receiver to receive a wireless signal indicating when and how far the actuator should open or close the attached valve or damper. For example, U.S. Pat. No. 7,641,172, incorporated by reference herein, discloses an actuator which is controlled by a wireless signal.

Many different mounting structures have been used for mounting the actuator to its associated valve or damper. Often the valve or damper is positioned in the building next to a wall, ceiling, floor or other structure which obstructs open access to the valve or damper. Not only must the actuator fit within the space around the valve or damper, but the mounting structure must also permit the same. Because the structures around the valve or damper change from installation to installation, it is beneficial for the mounting structure for the actuator to mount directly to the valve or damper, and not to any wall or other building structure.

However, this means that the mounting forces will be borne by the valve or damper. The mounting structure should attempt to keep the mounting force, and the forces transferred to the valve or damper upon movement, to a minimum. Within the limited space and mounting force considerations, the mounting system should be user friendly and permit speedy assembly and replacement of the actuator. However, many prior art actuator mounting structures do not adequately consider the limited space next to the valve or damper to accomplish as quick of a connection or disconnection as desirable.

BRIEF SUMMARY OF THE INVENTION

The present invention is a mounting apparatus and method to couple an actuator to a valve or damper for controllable actuation of the valve or damper. The mounting apparatus permits assembly with as few tools as possible, and particularly without the need for rotational advancement of a fastener toward or away from the valve or actuator within the confined space between the actuator and the valve or damper. The coupler includes a base which mates with an actuator mount, both of which encircle a rotational member for the valve or damper. A bail slides into an aligned hole in the base and the actuator mount to secure them together, so detachment and replacement of the actuator can be accomplished without tools.

BRIEF DESCRIPTION OF THE DRAWINGS

FIG. 5 is an exploded end view of the quick disconnect actuator coupler of FIGS. 1-4.

FIG. 6 is an assembled side view of the quick disconnect actuator coupler of FIGS. 1-5.

FIGS. 27-30 are top, end, bottom and side views of the handle used in the quick disconnect actuator coupler of FIGS. 1-6.

FIG. 31 is a cross-sectional view taken along lines 31-31 of FIG. 27.

Figure 1:
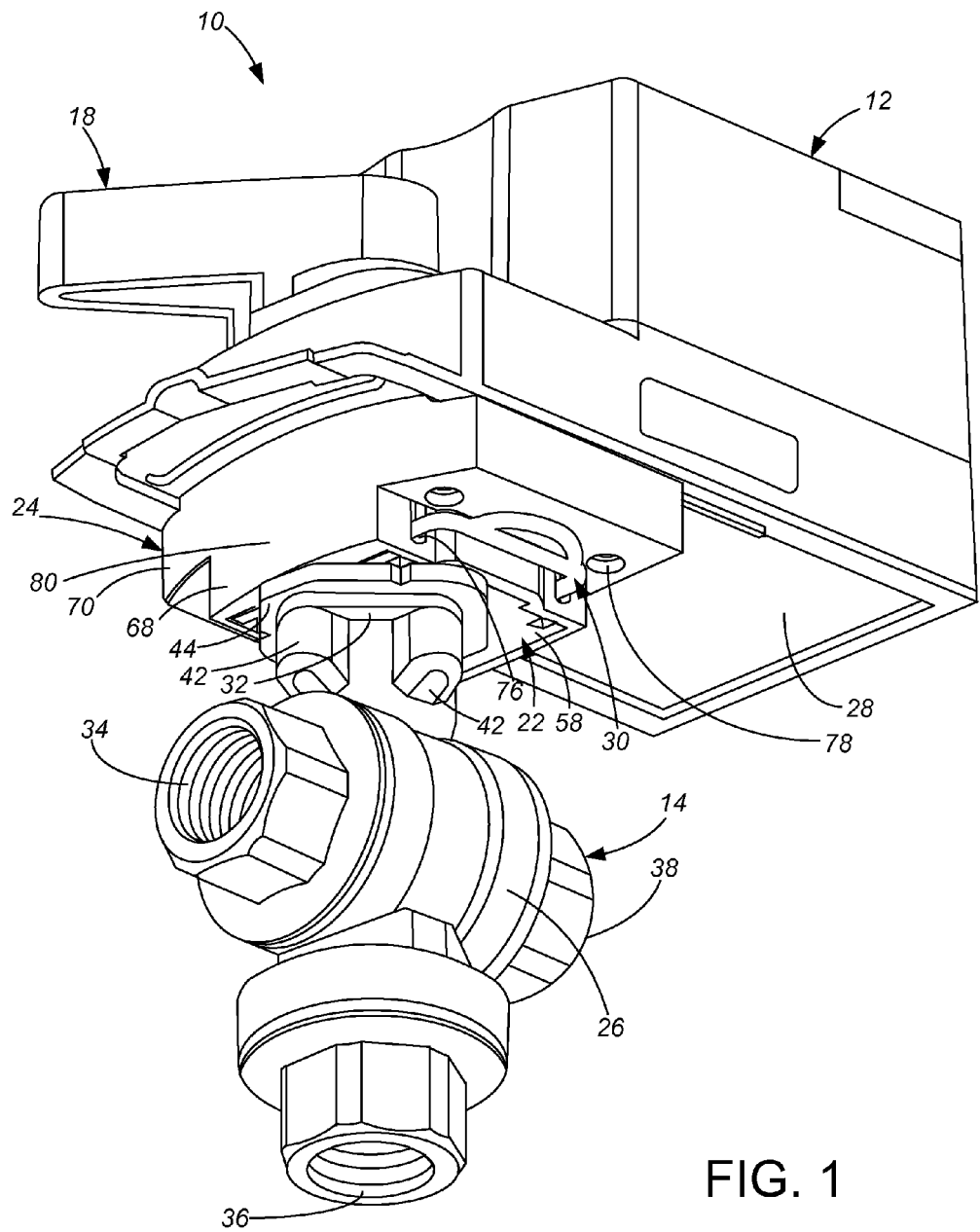
FIG. 1 is a perspective view of the quick disconnect actuator coupler of the present invention coupling an actuator to a valve.

While the above-identified drawing figures set forth a preferred embodiment, other embodiments of the present invention are also contemplated, some of which are noted in the discussion. In all cases, this disclosure presents the illustrated embodiments of the present invention by way of representation and not limitation. Numerous other minor modifications and embodiments can be devised by those skilled in the art which fall within the scope and spirit of the principles of this invention.

DETAILED DESCRIPTION

The present invention is a quick disconnect actuator mounting apparatus 10 and method. As shown in FIGS. 1 through 6, the apparatus 10 includes only five primary parts used to connect an actuator 12 to a valve 14 (or damper, not shown). Two of the parts, a coupler 16 (shown in FIGS. 2, 5 and 6) and a handle 18, rotate with the valve stem 20 (shown in FIGS. 2, 5 and 6) and are used to transfer the torque generated by the actuator motor to the valve stem 20. Two of the parts, a valve adapter 22 (also called the valve base) and an actuator mount 24 (also called the actuator base), are attached to the valve housing 26 and the actuator body 28, respectively, and remain stationary during actuation of the valve 14. The fifth part, a bail 30, is used to attach and detach the valve adapter 22 and the actuator mount 24.

Figure 2:
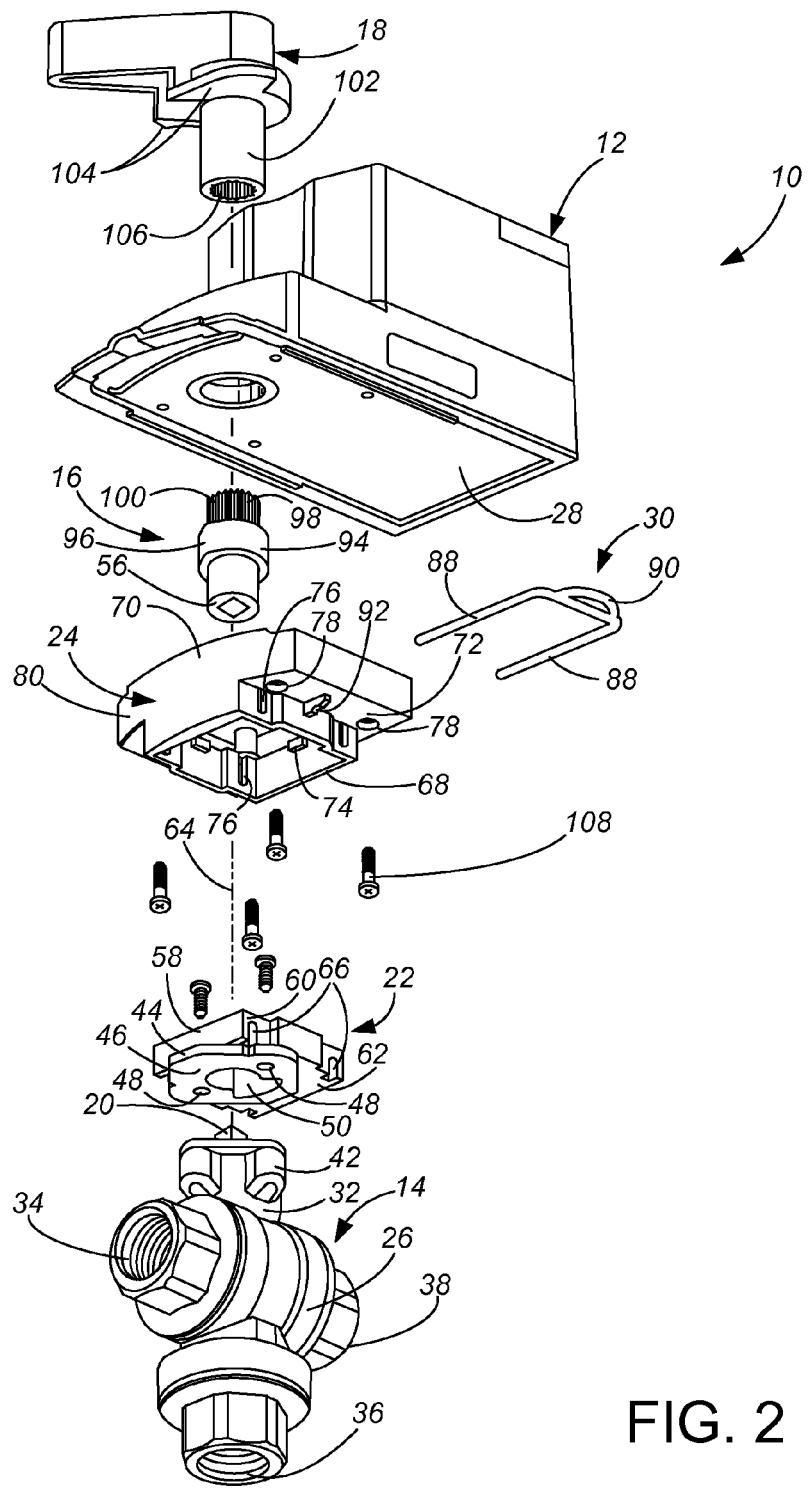
FIG. 2 is an exploded perspective view of the assembled quick disconnect actuator coupler of FIG. 1.
Figure 4:
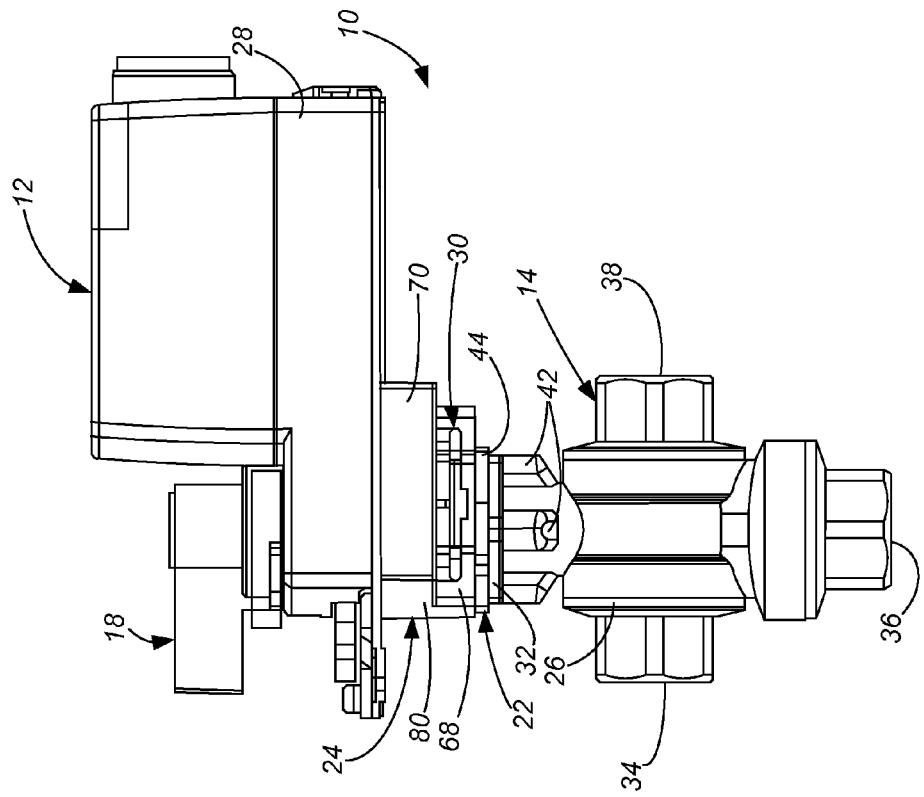
FIG. 4 is an assembled side view of the quick disconnect actuator coupler of FIGS. 1-3.
Figure 3:
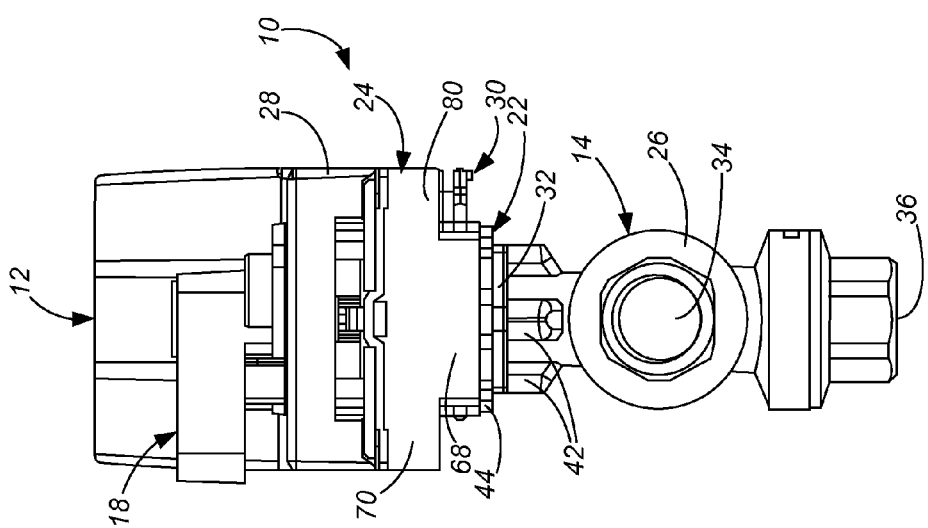
FIG. 3 is an assembled end view of the quick disconnect actuator coupler of FIGS. 1 and 2.

As best shown in FIG. 2, the valve 14 includes a valve stem 20 extending from an actuator mounting pad 32. As well known in the valve art, the valve stem 20 is joined to the flow closure member (i.e., the "ball" of a ball valve) within the valve housing 26. The particular valve 14 depicted is a three way ball valve in which turning the valve stem 20 fully in one direction positions the flow closure member to connect an input port 34 with one of the outlet ports 36, and turning the valve stem 20 fully in the other direction moves the flow closure member to connect the input port 34 with the second outlet port 38. The valve 14 could alternatively be used with the opposite flow direction, i.e., as a mixing valve rather than as a diverting valve, or could alternative be only a two way valve. In this case, the depicted valve 14 has ¾" threaded ports 34, 36, 38. The various dimensions reported herein correspond with a quick disconnect actuator coupler 10 for the ¾" ball valve, but can be readily modified in size corresponding to a larger or smaller valve or to a larger or smaller actuator depending upon the torque needed for the particular valve. The valve stem 20 is a rectangular drive, such as a 0.28 inch square drive.

The actuator mounting pad 32 includes a flat top surface 40 (shown in FIGS. 5 and 6) with a plurality of threaded bolt holes spaced around the valve stem 20, each bolt hole residing within a boss 42. In the preferred valve 14, there are four bolt holes/bosses 42 in a square or diamond pattern (bolt hole centers about 0.64 inches apart) surrounding the valve stem 20, with two of the bolt holes/bosses 42 aligned with the center line of the flow direction. The valve housing 26 and the valve stem 20 are preferably both formed of a strong, corrosion-resistant rigid material, such as brass or steel.

One side of the valve adapter 22 provides an alignment plate 44 which mates against the actuator mounting pad 32. The alignment plate 44 of the valve adapter 22 has a valve contact surface 46 which preferably covers the entire top side of the actuator mounting pad 32 to take its parallelism and alignment from the flat top surface 40. The alignment and parallelism of the valve adapter 22 results in the alignment and parallelism of the actuator 12 relative to the valve stem 20, and thus a substantial size of contact area between the valve contact surface 46 and the actuator mounting pad 32 is beneficial. The alignment plate 44 of the valve adapter 22 includes two bolt holes 48 which are sized and positioned to mate with two of the bolt holes 42 in the actuator mounting pad 32 of the specific valve 14 for which the valve adapter 22 is intended, i.e., if the valve has a different configuration of actuator mounting pad or holes therein, the alignment plate 44 should be correspondingly modified. In the preferred embodiment, this results in a generally rectangular (square) or diamond shape of the alignment plate 44, with an overall width of about 1.55 inches (around the bolt holes 48) and an overall length of about 1.43 inches. Alternatively, the valve adapter could have a number of openings to mate with a variety of bolt hole patterns on different configurations of actuator mounting pads. As another alternative, the valve adapter 22 could attach to the valve housing 26 through mechanisms other than bolts, such as with a clip-on snap fit. However, a bolted or screwed attachment is well known and unlikely to become dislodged over years or decades of use. As another alternative for use with a valve not having an actuator mounting pad, the valve adapter 22 could be arranged in a configuration which wraps around the valve housing 26 or attaches to other structure on the valve housing 26 such as one or more of the hexagonal port profiles. In most installations however, the parallelism and alignment benefits achieved with an actuator mounting pad 32 will outweigh the height lost of the actuator 12 above the valve housing 26.

The alignment plate 44 should be sufficiently thick to be rigid based upon its material of construction. In the preferred embodiment, the valve adapter 22 is injection molded of a lightweight, strong polymer, such as GS-63-13 NYLATRON. For this preferred material, an alignment plate thickness of about 0.1 inches is appropriate. If desired, a high pressure indicator card (not shown) can be positioned on the actuator mounting pad 32 between the valve housing 26 and the valve adapter 22, to show which port supplies the high pressure side of the valve 14.

Figure 7:
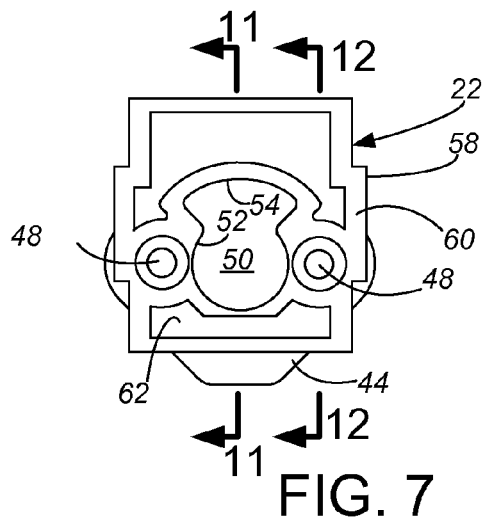
FIGS. 7-10 are top, end, bottom and side views of the valve adapter used in the quick disconnect actuator coupler of FIGS. 1-6.
Figure 8:
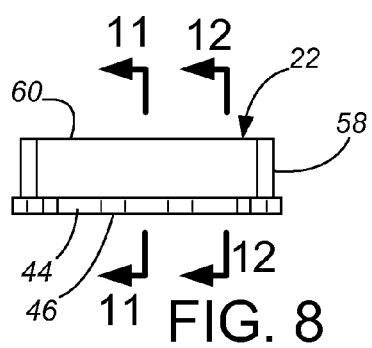
Figure 9:
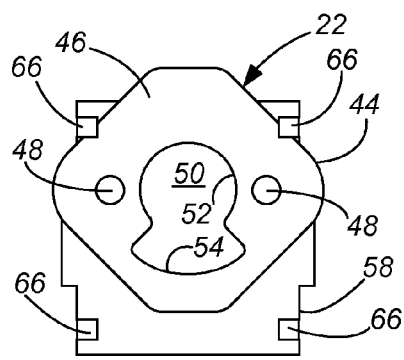

The alignment plate 44 includes a central opening 50 which extends around the valve stem 20. As best shown in FIGS. 7 and 9, the preferred central opening 50 includes a cylindrical portion 52 connected with a larger 90° recess 54. For instance, the cylindrical portion 52 of the depicted central opening 50 has a radius of about 0.28 inches, while the larger 90° recess 54 has a radius of about 0.49 inches. When assembled, this central opening 50 preferably extends around a lower portion 56 of the coupler 16 without contact, but alternatively could provide a bearing surface for the coupler 16.

The valve adapter 22 includes a locking extension 58 extending from the alignment plate 44, upward in the orientation shown in the figures. The locking extension 58 mates circumferentially within a recess in the actuator mount 24 in a male female relationship, to transfer both rotational torques and gravitational moments between the actuator body 28 and the valve housing 26. The locking extension 58 should be high enough and wide enough (in both directions) in contact within the actuator mount 24 to support these forces. At the same time, the locking extension 58 is preferably short enough so the height of the actuator 12 above the valve 14 is minimized and the actuated valve can fit in a smaller space. In the preferred embodiment, the locking extension 58 extends upward from the alignment plate 44 with a height of about ⅓ inch. In plan view, the shape of the locking extension 58 is generally rectangular, such as about 1½ inches by 1⅓ inches. To reduce weight and enhance moldability, the locking extension 58 is provided by a peripheral wall 60 extending from an intermediate wall 62, such as at wall thicknesses of about 0.1 inches when molded of the preferred material. Whether provided merely as a peripheral wall 60 defining an interior hollow or provided as solid around the central opening 50, the valve adapter 22 encircles the rotational axis 64 of the valve stem 20.

While the preferred valve adapter 22 is bilaterally symmetrical, the locking extension 58 extends further off one direction from the axis 64 of the valve stem 20, i.e., the valve stem 20 is about ½ inch from one end of the locking extension 58 and about 1 inch from the other end of the locking extension 58. By being offset in this direction, the valve adapter 22 better supports the weight of the preferred actuator 12. The orientation that the valve adapter 22 is placed on the valve 14 will result in the orientation of the actuator 12 relative to the valve 14. With two bolt holes 48 in the alignment plate 44, the valve adapter 22 has four potential orientations relative to the valve 14: two primary orientations wherein the actuator 12 will be in line with the valve 14, one shown in FIGS. 1-6 and at 180° thereto, and two secondary orientations which use the other two bolt holes in the actuator mounting pad 32 and orient the actuator 12 at 90° to the orientation shown in FIGS. 1-6. For other actuators which are centered on the valve stem 20, the locking extension 58 could alternatively be centered about the valve stem opening 50.

Figure 11:
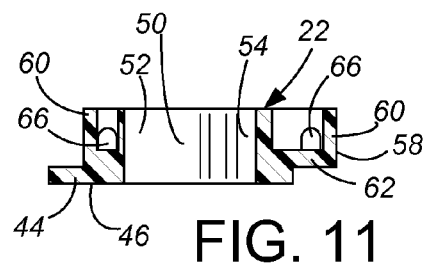
FIG. 11 is a cross-sectional view taken along lines 11-11 of FIGS. 7 and 8.
Figure 10:
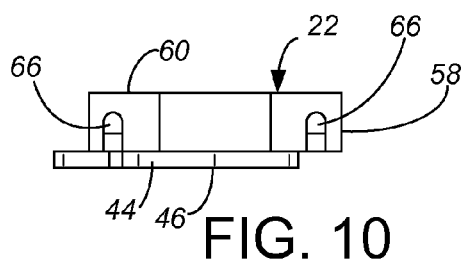
Figure 12:
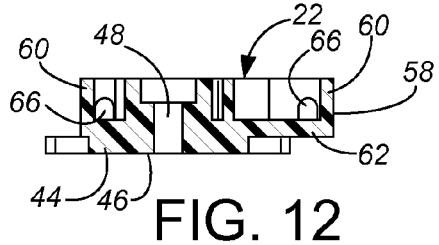
FIG. 12 is a cross-sectional view taken along lines 12-12 of FIGS. 7 and 8.

The valve adapter 22 has two through-holes 66 when viewed from the side views of FIGS. 10-12. The through-holes 66 are just above the intermediate wall 62 in the cross-sectional views of FIGS. 11 and 12, such that they extend transversely relative to the rotational axis 64 of the valve stem 20. The through-holes 66 are spaced on opposing sides of the valve stem 20, such as about 1.17 inches apart. Due to the offset of the valve adapter 22, this places one of the through holes 66 about 0.81 inches from the valve stem axis 64 and the other through hole about 0.37 inches from the valve stem axis 64. Because the locking extension 58 is primarily provided as a peripheral wall 60 and for moldability, the through-holes 66 are actually provided as four through-hole slots 66 individually shown in FIG. 9, i.e., formed in the molding operation and without any drilling operation. These through-holes 66 are subsequently used to quick-attach the valve adapter 22 to the actuator mount 24.

The actuator mount 24 includes a peripheral locking extension wall 68 joined to an actuator base portion 70 by an intermediate wall 72. In the preferred embodiment, the actuator mount 24 is injection molded of the same lightweight, strong polymer as used for the valve adapter 22. The locking extension wall 68 mates around the peripheral wall 60 of the locking extension 58 of the valve adapter 22. Thus, the locking extension wall 68 also encircles the rotational axis 64 of the valve stem 20. Four tabs 74 can be provided as stops when inserting the valve adapter 22 into the actuator mount 24. The peripheral locking extension wall 68 of the actuator mount 24 preferably has the same height as the locking extension 58 on the valve adapter 22.

Figure 13:
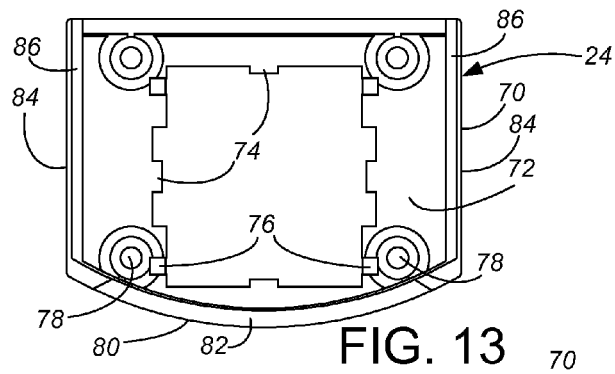
FIG. 13-16 are top, end, bottom and rear (upside down) views of the actuator mount used in the quick disconnect actuator coupler of FIGS. 1-6.
Figure 14:
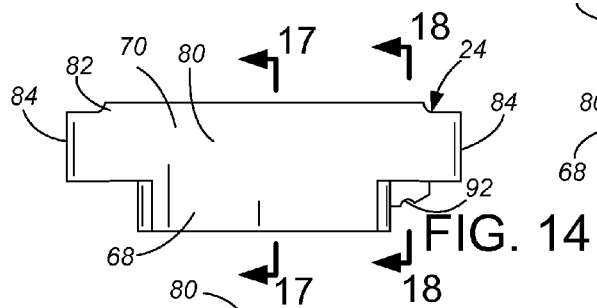
Figure 17:
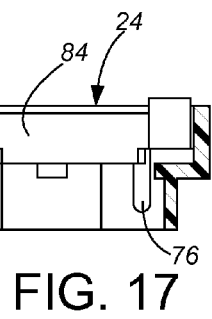
FIG. 17 is a cross-sectional view taken along lines 17-17 of FIG. 14.

The locking extension wall 68 of the actuator mount 24 has through-holes 76 that align with the through-holes 66 of the locking extension 58 of the valve adapter 22. To connect on both sides of the locking extension 58, the locking extension wall 68 has four through-hole slots 76 individually shown in FIG. 13, i.e., formed in the molding operation and without any drilling operation. These through-holes 76 of the actuator mount 24 are subsequently used in conjunction with the through-holes 66 of the valve adapter 22 to quick-attach the valve adapter 22 to the actuator mount 24.

Figure 15:
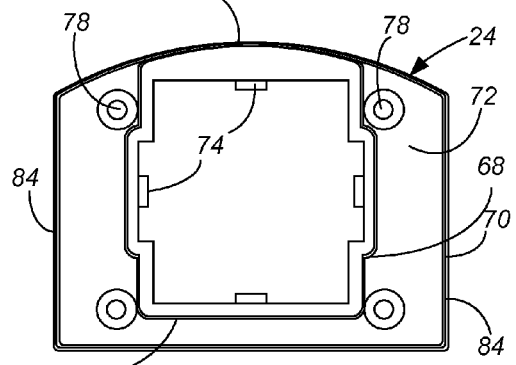
Figure 18:
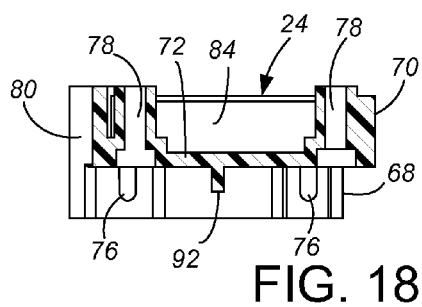
FIG. 18 is a cross-sectional view taken along lines 18-18 of FIG. 14.

The actuator base portion 70 is generally sized to match the construction of the actuator 12 that will be used. In this case, four bolt holes 78 are provided at locations determined by the actuator body 28, which in this case is a rectangular pattern of about 1⅓×1¾ inches. As best shown in the plan view of FIG. 15, the generally rectangular outer shape of the locking extension 68 is modified somewhat to avoid interference with the bolt holes 78, as is the corresponding mating shape of the attachment extension 58.

Figure 16:
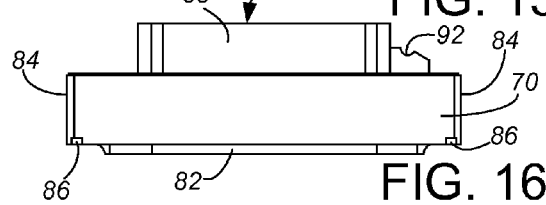
Figure 19:
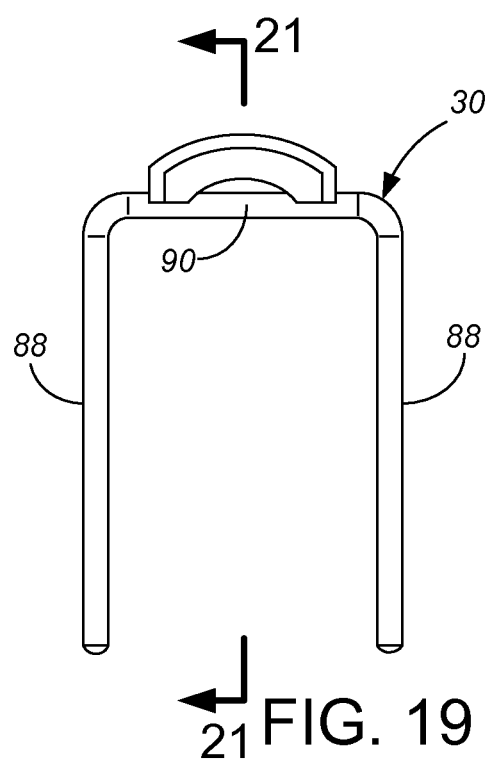
FIGS. 19 and 20 are top and end views of the bail used in the quick disconnect actuator coupler of FIGS. 1-6.
Figure 21:
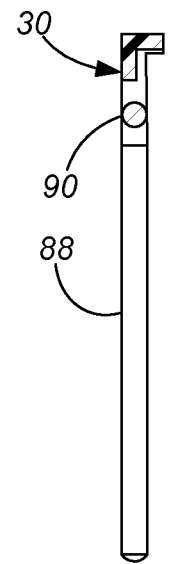
FIG. 21 is a cross-sectional view taken along lines 21-21 of FIG. 19.
Figure 20:
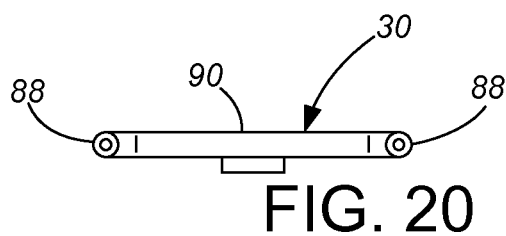
Figure 23:
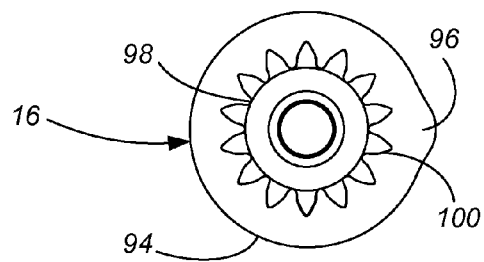
FIGS. 23-25 are top, side and bottom views of the coupler used in the quick disconnect actuator coupler of FIGS. 1-6.
Figure 26:
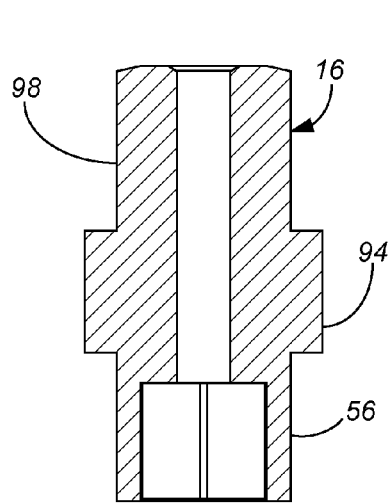
FIG. 26 is a cross-sectional view taken along lines 26-26 of FIG. 24.
Figure 24:
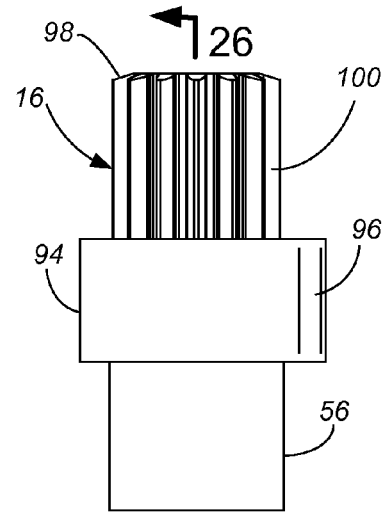
Figure 22:
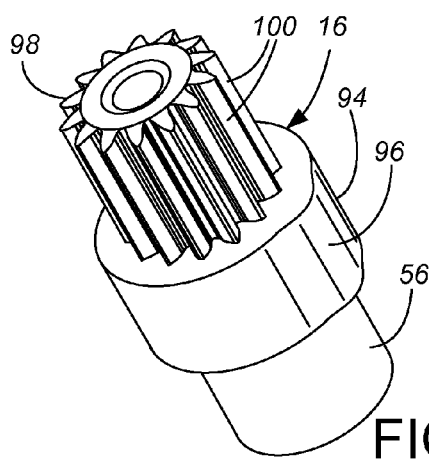
FIG. 22 is a perspective view of the coupler used in the quick disconnect actuator coupler of FIGS. 1-6.
Figure 25:
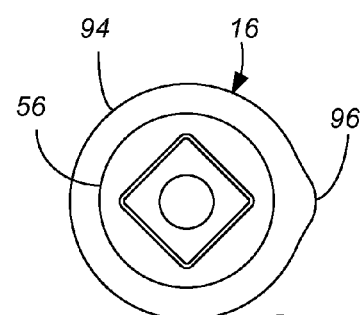

A large curved front wall 80 mirrors the curvature of the front of the preferred actuator 12. The front wall 80 of the actuator base portion 70 includes a small tab portion 82, and the side walls 84 of the actuator base portion 70 include small notches 86 (shown in FIGS. 13 and 16), both to match the contours of the bottom of the preferred actuator 12.

One or two retention key members 88 are used in the aligned through-holes 76 of the actuator mount 24 and throughholes 66 of the valve adapter 22 to secure the valve adapter 22 to the actuator mount 24. In the preferred embodiment, the keying is provided by a flexible forked bail 30. The bail 30 includes two legs 88 each sized to match the size of the through-holes 66, 76. When in place, the legs 88 extend around the coupler 16 and hold the actuator mount 24 to the valve adapter 22 on both sides of the coupler 16. The two legs 88 are joined with a clip portion 90, which provides a grasping location for hand pushing the legs 88 into the through-holes 66, 76 and hand pulling the legs 88 out of the through-holes 66, 76.

When fully inserted, the preferred clip portion 90 mates with a snap or detent into a retention notch 92 on the actuator mount 24. To enable this snap-fit, the bail 30 can be formed of a material which is more flexible than the material of the adapter 22 and mount 24, such as out of ULTRAMID polymer. In the preferred embodiment, the retention notch 92 is only provided on one side of the actuator mount 24, while the aligned through-holes 66, 76 are available on both sides of the actuator mount. If desired, the bail 30 can be used from the other side of the aligned through-holes 66, 76 without using the retention notch 92. Alternatively, a second retention notch (not shown) can be placed on the other side of the actuator mount 24, allowing the bail 30 to be used from whichever side of the actuator 12 provides the easiest access.

The coupler 16 and the handle 18 both rotate with the valve stem 20, transferring torque from the actuator 12 to the valve stem 20. Because the coupler 16 is a relatively small part transferring significant forces, it is preferably formed of a strong, corrosion resistant metal, such as machined from 316 stainless steel. The coupler 16 includes a socket end 56 sized to match the valve stem 20. During use, the socket end 56 resides within the valve adapter 22. A central portion 94 of the coupler 16 can be generally cylindrical but include directional pointer 96. The directional pointer 96 is helpful to identifying rotation of the valve stem 20 or actuator 12 in troubleshooting any problems. The opposite end 98 of the coupler 16 is splined with pinion teeth 100 extending about ½ inch from the central portion 94.

The handle 18 is used both to connect the actuator 12 for transferring the rotational torque of the actuator 12 to the coupler 16 and thereby to the valve stem 20, and for rotating the valve stem 20 by hand. It can be formed of a strong polymer such as glass filled nylon. The handle 18 includes a 16 mm round shaft 102 which mounts directly to the actuator 12. The handle 18 also includes two angular pointers 104 which are used in conjunction with the actuator 12 to read out the rotational position of the handle 18. The pinion teeth 100 of the coupler 16 mate into a splined or pinion tooth opening 106 in the shaft 102 so the handle 18 transfers torque to the coupler 16.

To secure the actuator 12 to the valve 14, first the actuator mount 24 is attached to the actuator 12 such as with screws or bolts 108 (shown in FIG. 2). In the preferred method, the handle 18 and the coupler 16 are also positioned and secured by the rotational collar of the actuator 12. Note that all of this assembly can be performed either by the manufacturer or supplier of the actuator 12 or on a bench, i.e., not in the location of final use where space may be limited. The valve adapter 22 is attached onto the valve 14 such as with screws or bolts 108. Again this could be done by the valve manufacturer or supplier or on a bench. More commonly the valve 14 is first installed into piping by a plumber and the valve adapter 22 is then attached to the actuator mounting pad 32 by the actuator installer. But, with the valve adapter 22 attached to the valve 14 prior to placement of the actuator 12, at a minimum the space which will be occupied by the actuator 12 will be available for tightening the bolts 108 into the bolt holes/bosses 42 on the actuator mounting pad 32.

The handle 18 and coupler 16 are rotated to the position of the valve stem 20 (or vice versa), and then the attachment extension wall 68 of the actuator mount 24 is slid over the attachment extension 58 of the valve adapter 22, pushing the actuator 12 down toward the valve 14 so the valve stem 20 seats in the socket end 56 of the coupler 16 and the throughholes 76 on the actuator mount 24 align with the throughholes 66 on the valve adapter 22. The bail 30 is then slid into the aligned through-holes 66, 76, and pushed in by hand until the clip 90 snaps into place in the retention notch 92. The bail 30 then holds the actuator mount 24 to the valve adapter 22 at four separate locations, essentially at the four corners of the rectangular shape. The four corner attachment readily withstands any bumping or jostling of the actuator 12 during years or decades of normal use.

This attachment is quickly and easily done by hand, sliding the bail 30 (horizontally as oriented in the figures) in line with the piping and in the space between the actuator 12 and the valve 14. Thus, it will be understood that quick disconnect actuator coupler 10 of the present invention permits initial assembly with as few tools as possible, and particularly without the need for rotational advancement of fasteners toward or away from the valve 14 (or damper) or actuator 12 within the confined space between the actuator 12 and the valve 14 (or damper). With the preferred actuator 12, the entire stack can be assembled in a space of only about 3¾ inches from the actuator mounting pad 32. The electrical connections to the actuator 12 are then completed using methods known in the art (such as using a screwdriver to attach the actuator power wires).

An even larger benefit is achieved if the actuator 12 needs to be serviced or replaced. Instead of attempting to service the actuator 12 in place, the technician can quickly disconnect the actuator 12 from the valve 14 without any tools by hand grasping and bending the clip 90 on the bail 30 out of the retention notch 92 and then sliding the bail 30 outward. The actuator 12 with the attached actuator mount 24 is then simply slid (upward in FIGS. 1-6) away from the valve 14, freeing the actuator 12 for service or replacement outside of the tight confines around the valve 14. Of course, while the bail 30 can be removed without any tools, the technician can alternatively use a tool such as a pliers to grasp and pull the bail 30 from the through-holes 66, 76. If desired, a tie (not shown) can be used with the bail 30 so the bail 30 is held to the valve 14 and not lost during the time that the actuator 12 is being worked on. The tie can also be used to pull the bail 30 from the throughholes 66, 76. In either event, it will be understood that the quick disconnect actuator coupler 10 of the present invention permits subsequent detachment and reattachment of the actuator 12 without any tools, with the bail 30 only moving in a direction transverse to the rotational axis 64, i.e., without moving the bail 30 toward or away from the valve 14 (or damper) or toward or away from the actuator 12 within the confined space between the actuator 12 and the valve 14 (or damper).

Although the present invention has been described with reference to preferred embodiments, workers skilled in the art will recognize that changes may be made in form and detail without departing from the spirit and scope of the invention.

The invention claimed is:

1. A quick disconnect actuator coupler for mounting an actuator to a valve or damper of an HVAC system, comprising:
   a base encircling a rotational axis of a rotational control member of the valve or damper, the rotational control member being moveable about the rotational axis between an open position wherein the valve or damper permits flow and a closed position wherein the valve or damper permits less flow or no flow to at least one outlet, the base being securable to a valve housing or damper housing via assembly substantially exclusively in an axial direction so the base encircles the rotational control member;
   an actuator mount encircling the rotational axis, the actuator mount being securable to an actuator body;
   wherein the base and the actuator mount have a mating relationship which allows sliding assembly of the actuator mount to the base in an axial direction, which when mating define at least one hole in both the base and the actuator mount extending transversely relative to the rotational axis, the mating relationship preventing rotational movement of the actuator mount relative to the base, the mating relationship preventing lateral movement of the actuator mount relative to the base; and
   a bail which slides into the hole to secure the actuator mount to the base against axial movement, with the rotational control member being rotational within the joined actuator mount/base for rotational movement caused by the actuator, sliding of the bail out of the hole allowing toolless removal of the actuator from the valve or damper.

2. The quick disconnect actuator coupler of claim 1, wherein the base and the actuator mount when mating define a set of holes through both the base and the actuator mount on opposing sides of the rotational control member, and wherein the bail is a forked bail having legs which slide into the set of holes, such that, when securing the actuator mount to the base encircling the rotational axis, the rotational axis extends between the legs.

3. The quick disconnect actuator coupler of claim 2, wherein each hole in the set of holes is comprised of two throughholes in the base and two throughholes in the actuator mount, with all four throughholes being linearly aligned.

4. The quick disconnect actuator coupler of claim 1, wherein the bail mates into the hole with a snap fit holding the bail into the hole.

5. The quick disconnect actuator coupler of claim 1, wherein the bail is molded of a polymeric material which flexes to cause the snap fit.

6. The quick disconnect actuator coupler of claim 1, wherein the hole is comprised of a throughhole in the base and a throughhole in the actuator mount.

7. The quick disconnect actuator coupler of claim 6, wherein the hole is comprised of two throughholes in the base and two throughholes in the actuator mount, with all four throughholes being linearly aligned.

8. The quick disconnect actuator coupler of claim 1, wherein the actuator mount encircles the base around the rotational control member.

9. The quick disconnect actuator coupler of claim 8, wherein the base has a generally rectangular outer profile mating into a generally rectangular recess in the actuator mount, with walls of the actuator mount fully encircling the rectangular outer profile of the base to prevent lateral movement of the actuator mount relative to the base.

10. The quick disconnect actuator coupler of claim 1, further comprising a stem coupler, the stem coupler having a recess which joins around a stem of the valve or actuator.

11. The quick disconnect actuator coupler of claim 10, wherein the stem coupler comprises a splined opposite end, and further comprising a handle which mates around the splined opposite end.

12. The quick disconnect actuator coupler of claim 11, wherein the base, the actuator mount, the bail, and the handle are all molded of polymeric material, and wherein the stem coupler is formed of a metal.

13. The quick disconnect actuator coupler of claim 12, wherein the bail is molded of a material which is more flexible than the material of the base or the material of the actuator mount.

14. The quick disconnect actuator coupler of claim 10 further comprising a handle, wherein the actuator rotates the handle, which in turn rotates the stem coupler, which in turn rotates the stem of the valve or actuator.

15. The quick disconnect actuator coupler of claim 1, for use with a valve or damper as part of an HVAC system, wherein the base is securable to the valve housing or damper housing using threaded screws or bolts and without a yoke.

16. The quick disconnect actuator coupler of claim 1, wherein the base comprises an alignment plate which takes its alignment and parallelism by making contact with a flat actuator pad of the valve or damper.

17. A method of attaching an actuator to a valve or damper of an HVAC system, comprising:

securing a base to a valve housing or damper housing such that the base encircles a rotational axis of a rotational control member of the valve or damper, the rotational control member being moveable about the rotational axis between an open position wherein the valve or damper permits flow and a closed position wherein the valve or damper permits less flow or no flow to at least one outlet, the securing being achieved via assembly substantially exclusively in an axial direction so the base encircles the rotational control member;

securing an actuator mount to an actuator body;

aligning the base and the actuator mount into a mating relationship by sliding assembly of the actuator mount to the base in an axial direction, the mating relationship preventing rotational movement of the actuator mount relative to the base, the mating relationship preventing lateral movement of the actuator mount relative to the base, such that the actuator mount encircles the rotational axis, and such that the base and the actuator mount define at least one hole in both the base and the actuator mount extending transversely relative to the rotational control member;

attaching the actuator to the rotational control member such that the actuator can move the rotational control member between the open position and the closed position;

sliding a bail into the hole to secure the actuator mount to the base against axial movement, with the rotational control member being rotational within the joined actuator mount/base for rotational movement caused by the actuator, and such that sliding of the bail out of the hole allows toolless removal of the actuator from the valve or damper.

18. The method of claim 17, further comprising snapping the bail into a detent to hold the bail into a secured position in the hole.

* * * * *